Patented Dec. 16, 1947

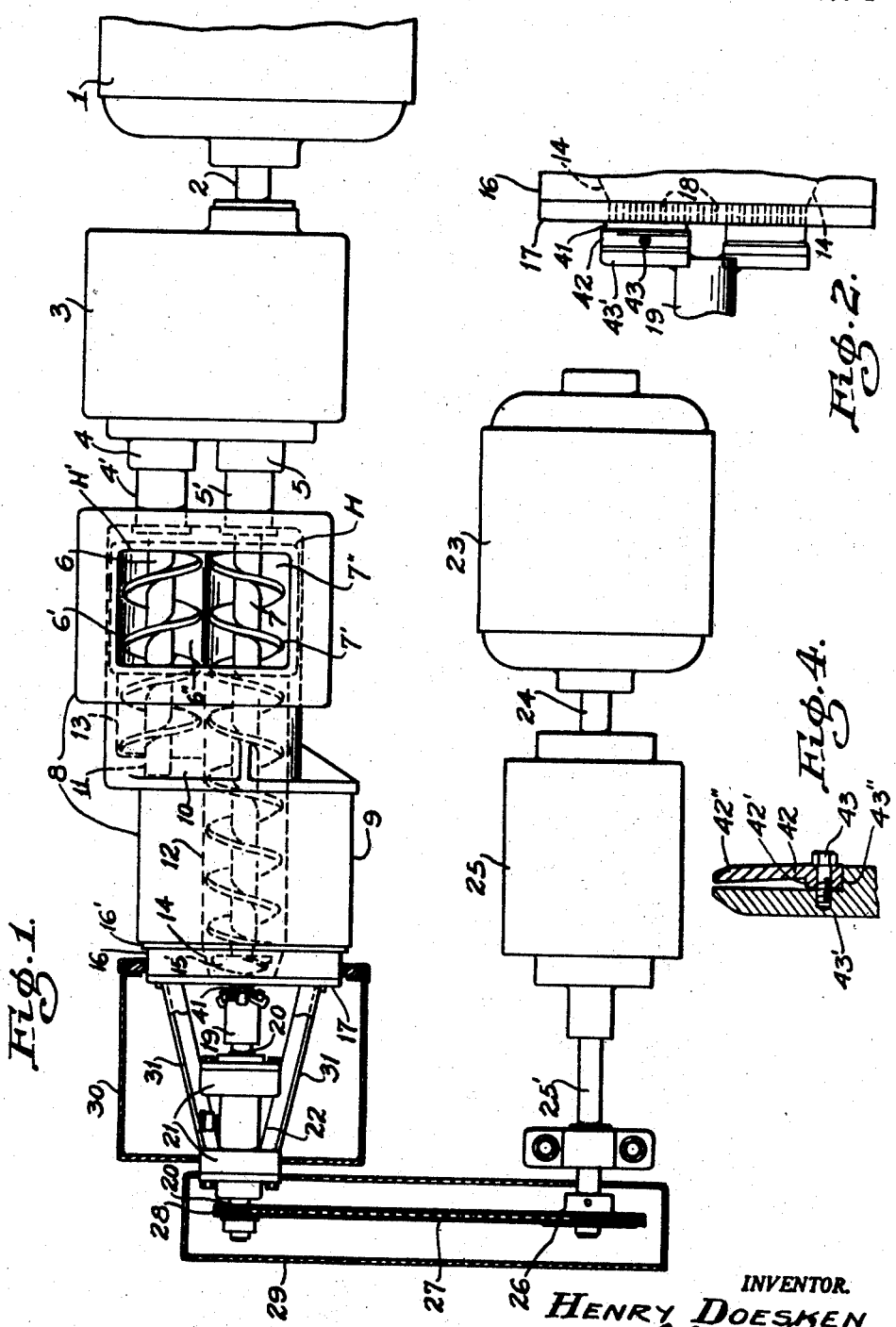

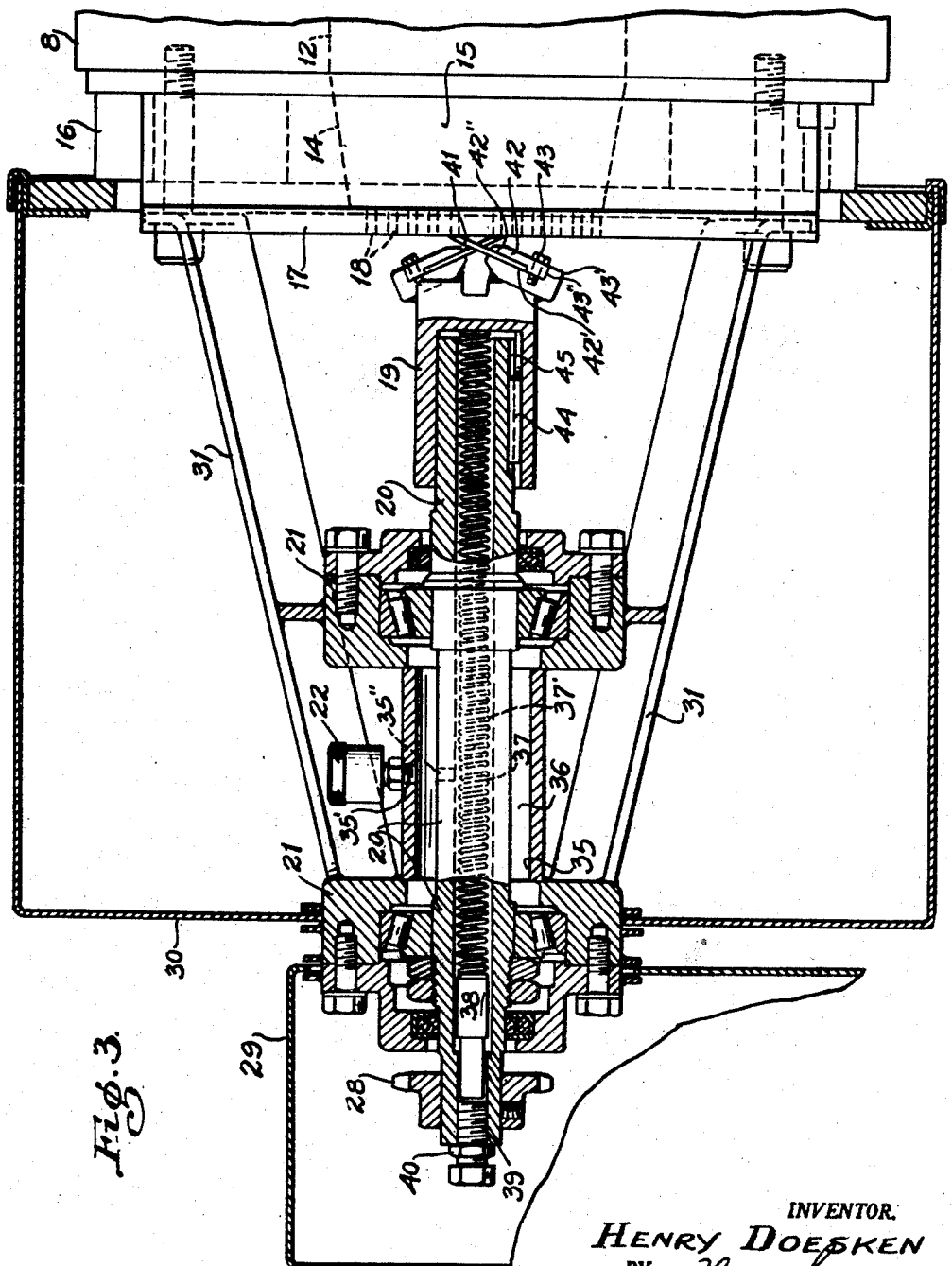

2,432,734

UNITED STATES PATENT OFFICE 2,432,734

EXTRUSION DEVICE FOR FORMING PELLETS

Henry Doesken, Los Angeles, Calif., assignor to Filtrol Corporation, Los Angeles, Calif., a corporation of Delaware Application December 16, 1944, Serial No. 568,539

3 Claims. (Cl. 25—109)

This invention relates to an extrusion device for forming pellets, such as pellets of catalysts.

It is an object of this invention to extrude material through a die and to cut off the extruded material so as to produce pellets of uniform length having ends with sharp edges and substantially perpendicular to the axis of the extruded material. Screw or auger type extruders and other types of extruders in which semi-plastic material is forced through dies commonly employ various methods for cutting extruded material into desired lengths. For ordinary types of uses the characteristics of the ends of the pellets thus formed are not of material importance. In forming pelleted catalysts, however, the characteristics of the end portion of the pellet become of importance since any deformation of the ends of the pellet results in a zone of weakness where splitting or attrition results.

I have found that in order to obtain extruded pellets having ends of the desired shape it is desirable to cut the pellet as it extrudes through the die plate by means of a knife which is so mounted at such an angle to the face of the die and is operated at a sufficient velocity across the face of the die so that the following pellets do not abut against the back of the knife with sufficient pressure to deform the pellet. The cutting edge of the knife, as it cleaves through the extruded material, must be maintained continuously at a satisfactory degree of sharpness. In all such pelleting operations, using the extruders of the prior art, it therefore becomes necessary to replace the knives as the knife edges become dulled from use.

It is an object of my invention to provide a cutting mechanism in which the cutting knives will require replacement less frequently and in which the knives which I employ will maintain their suitable cutting edge for a substantially longer operating period than formerly.

It is a further object to so mount the knives of my invention that their replacement by even an unskilled workman takes but a fraction of the time required by prior art extruders.

I attain these improvements and operating economies by a simplification of the knife mounting. I mount the knife by means of a single and easily accessible holding bolt, which secures and positions the cutting knife against a suitable shoulder on a knife-keeper plate and in turn also properly positions and secures the cutting knife and a knife-keeper plate against a similar shoulder on the arm of my cutterhead.

In the extruder of my invention it is not now necessary to disassemble the cuttingheader from the drive shaft in order to remove the knife. I have arranged for the replacement of a new set of cutting knives on the header while the header still remains in its normal position on its drive shaft.

I have found that in order to produce in such extrusion machines pellets of uniform length it is desirable to maintain a uniform pressure of the knife against the die plate as the knife moves across the extrusion die plate. In pellet extruding devices, due to various operating causes, it is difficult to maintain a uniform pressure on the material to be extruded against the face of the die. I have noticed that frequently pressures are applied which are strong enough to force the die plate outwardly and even to buckle the die plate into the plane of the rotating knives. When this happens, not only is the cutting edge of the knives badly damaged, but also the die plate itself becomes mutilated by the knife and the cutting knives and the die plate must then be renewed. My invention overcomes this difficulty.

I employ a floating-header to hold the knife. The header is resiliently and slidably and rotatably mounted on the drive shaft. The drive shaft carries a spring which presses the knives against the die plate. The compression of the spring and therefore the pressure of the knives against the die plate may be adjusted, thereby maintaining the proper position of the floating-header in relation to the die plate. The knives are also made of flexible spring steel so that their inherent flexibility causes them to press with a yieldable pressure against the die plate so that a regulatable and uniform pressure is maintained against the die plate notwithstanding the possibility that the die plate itself might be forced out of its original vertical plane by excessive pressures, as previously described.

I thus attain the required regulatable pressure of the cutting knives against the die plate, not only because of the spring, but also because I employ a cutting knife fabricated from flexible spring steel and of up to about $\frac{1}{16}$" thickness or thereabouts.

The regulation of the pressure of the knives against the die plate is important since it permits the adjustment of the degree of the pressure of the knives against the die plate for the pelleting of various types of material of differing density and plasticity.

For the above and other reasons, as will be apparent to those skilled in the art, my invention avoids the mutilation of the die plate and the consequent destruction of the cutting edge of the cutting knives. The pellet-cutting mechanism of our invention is highly flexible. The pressure of the pellet cutting knives on the die plate as the knives sweep across the face of the die is self-adjustable to maintain a regulatable pressure on the die plate face.

The resilient mounting of the knife also insures that the pellet ends will not be mutilated should the material, exiting from the extrusion die holes, abut against the back of the knife. If as a result of variations in extrusion rate or variations in speed of rotation of the knives, notwithstanding the angularity of the knife, the extruded material abuts against the back of the knife, the pressure of such extruded material will cause the knife to back off so as not to squash the pellets. The compression caused by the spring may be adjusted to the desired level for this purpose.

My invention will be better understood by reference to the following description of the preferred embodiment of my invention taken together with the drawings, in which Figure 1 is a plan view of our extruder.

Figure 2 is a plan view of the cutting knife mounting on the floating header.

Figure 3 is a plan view of the pellet cutting mechanism.

Figure 4 discloses the detail of knife mounting.

In Figure 1, the power from auger drive motor 1 is delivered through shaft 2 to variable speed transmission 3 and thence through speed reducing gears 4 and 5 to shafts 4' and 5' to, respectively, auxiliary rotating auger 6 and main auger 7 residing respectively in barrels 6" and 7". Barrels 6" and 7" have free intercommunication and contain respectively auxiliary auger 6 and main rotating auger 7. Auger 6 is journaled at one end at 11. Auger 6 serves as a feeder to auger 7 by means of plow 10. The auger mechanism is enclosed in housing 8 through which hopper H—H' supplies the feed of material to the augers for subsequent extrusion. The end of the extruder consists of a spacer liner 16' in line with barrel 7" and main auger 7 and spacer plate 16 having one tapered opening 14 also in line with barrel 7" and main auger 7 and a die plate 17. The plane faced die plate 17 carries perforations 18 also in line with barrel 7". The flights on augers 6 and 7 are represented by 6' and 7'.

The combined openings in spacer-liner 16' and in spacer plate 16 form a reservoir-chamber 15. The impeller 15' mounted on auger 7 is positioned within chamber 15 and is spaced from die plate 17. Knives secured to floating extruder cutter header 19 rotate across the face of the plate 17, which carries the die holes 18. The floating header or cutterhead 19 will be described below. The cutting header is slidably and rotatably held on shaft 20. The axis of the shaft 20 is coincident with the axis of the extruder auger 7 and with the center of the die plate 17 so that the knives sweep over the die plate around its center. The header 19 is thus rotated by shaft 20 positioned in bearings 21, by sprockets 28 and 26, which are driven by chain 27. The pellet cutting mechanism is driven by motor 23 through drive shaft 24 to variable speed transmission 25 and shaft 25' to drive sprocket 26. Other types of drive may be provided, as for instance, by suitable gears or variable diameter V-groove pulleys. The cutter driving sprockets are protected by housing 29 and 30 is the housing for the cutter mechanism.

As shown in Figure 3, the drive shaft 20 is bored or hollow at 37 to receive a coil spring 37' which abuts against the end of the header 19 and is retained in place at the other end against a spring-follower 38. The position of the follower is adjusted by screw 39 held securely in position by lock nut 40. The compression, thus adjustably regulated by the positioning of the follower 38, provides for regulatable pressure of the knives against the die face. An oil splash hole is provided at 35" communicating between the interior bore 37 and the drive shaft housing 35 held between the bearings 21. A lubricator 22 is connected with the bore 35'. The bearings 21 are mounted on cutter frame support 31, which in turn is mounted on the extruder. The lubricant passing from 22 through shaft housing 35 passes through the splash hole 35" from oil reservoir 36 to lubricate the bore 37 and spring therein and also the header 19 and the bearings. The header 19, as described below, carries a keyway 45, and spline key 44 is fastened on shaft 20. The end of the floating header 19 carries the knife brackets or header arms 43' on each of which I mount a pellet cutting knife 41 and a knife keeper plate 42.

The flat spring steel knife 41 is mounted between the header arm 43' and the keeper plate 42 which abuts against a supporting shoulder 43" of the header arm 43'. A bolt 43 holds the knife securely in position between the keeper plate 42 and the header arm 43' and permits, by its removal, the quick removal and replacement of the knife without removing the header from its operating position on shaft 20. As shown in Figures 3 and 4, knife 41 rests against keeper-plate shoulder 42' of keeper-plate 42 and, as previously mentioned, both the plate and knife rest against header-arm shoulder 43" of header-arm 43'.

Figure 4 shows a fragmentary detail of one arm of the floating header, which header is shown mounted in Figure 3. In Figure 4 is also shown in greater detail the method of mounting and some further details of knife-keeper plate 42 but with the cutting knife 41 not being in position. Keeper-plate 42 is formed with a somewhat flexible lip 42" above the keeper-plate shoulder 42'. The inner face of the keeper-plate or that side of the plate which contains shoulder 42' is beveled so that the width of the opening between the keeper-plate 42 and the header arm 43' is greater at the keeper-plate shoulder than it is at the entrance to the opening that is formed between lip 42" and header arm 43'. The width of the entrance is less than the thickness of the knife when the bolt 43 is tightened. When the knife is inserted in this opening and the bolt 43 is screwed into place, the lip 42" of keeper-plate 42 is bent so as to press the cutting knife with a spring and vice-like action firmly against the header arm 43'.

The axis of the shaft 20 is coincident with the axis of the extruder auger 7 and with the center of the die plate 17 so that the knives sweep over the die plate around its center.

As also shown in Figure 2, the knives are of such width or length that they sweep across the whole face of the die provided with the orifices 18. The back of the knives facing the die plate are plane surfaces and the keeper 42 is beveled at its end, and the knives are positioned at such an angle to the die plate so that, at minimum practical speed of rotation of the knife header and the minimum practical extrusion rate of the pellets, the knives sweep suitably across the die plate to cut off the pellets so as to produce square and clean-cut pellet ends. The angle of the knives against the die face together with the resilient mounting together with the relative rate of travel is such as to insure that pellets will not abut against the plane back of the knife with sufficient pressure to deform the pellet ends. A suitable angle for mounting the knives is about 20° to 30° measured against the die face. In other words, my invention protects the shaped extruded material from mutilation during the cutting of such extruded material into uniformly shaped pellets.

In order to mount my floating cutter header, housing 31 is removed from the extruder by removing bolts suitably provided as shown, and the cutterheader may then be slid over the end of the shaft 20 with spline key 44 properly engaged in keyway 45. In order to remove the knife from the header, it is merely necessary to remove one bolt 43 and the keeper plate 42 may then be removed and the knife removed or introduced in place. When the header is placed over the end of the shaft, the cutter housing may then be attached to the extruder. By adjusting the compression control screw 39, the desired pressure may be exerted via spring 37' against the end of the header and the knives will then press with the desired degree of uniformly maintained pressure against the face of the die plate. As the knives sweep across the die plate to cut the extruded material into pellets, the extruded material, which is moving through the die orifices at a rate controlled by the speed of rotation of the screw, is forced out of the die plate orifices.

In the present construction my header cutting knives, being resiliently mounted, yield under the self regulatable pressure of my invention so as to cut off the material extruded from the die plate orifices into suitably shaped pellets without mashing the ends of such pellets. Additionally, where excessive extrusion material pressure is the cause of either the buckling or the distortion of the die plate, my resiliently mounted knives will then flex and also my floating header itself will then move to accommodate suitably any such excessive pressure and my knives will not then gouge into the face of the plate, nor will the knife cutting edge become damaged by any such die plate distortion.

In my extruder, the knives last much longer and need not be replaced as frequently as when inflexibly mounted knives are secured to a rigidly mounted cutterheader. Considerable experience with my type of cutter mounting has shown a large reduction in the cost of knives and the cost of operations involved in changing and replacing knives. Thus, on an extruder employed in the production of extruded acid activated clay pellets employed as cataylst, the cost in changing knives when employing my invention is but about 4% of the cost with the rigidly mounted knives of the prior art extruders. The time lost in changing cutting knives employed with the old rigid type cutting header, representing the per cent of the time during which the extruder was down in order to change the knives, based on total time consumed in operation and in changing knives, was 42%; whereas with the floating type header of my invention it was but 1%.

While the above cutter mechanism has been described in connection with a screw type extruder in which it has particular utility, the principles of our invention are applicable to other types of extruders in which extrusion is caused by plungers, rollers, or other mechanisms in the place of a screw or auger. It may be also applied to extruders wherein both the knife and the die plate move relatively to each other or to extruders where the knife is stationary and the die plate moves relative to the knives which may be stationary.

It is to be understood that the foregoing description of the embodiments of my invention is for purposes of illustration, and modifications may be made therein without departing from the spirit of the appended claims.

I claim:

1. An extruder including a die plate, means for extruding material through said die plate, a rotatable knife mounted to rotate across the face of said die plate, comprising a hollow shaft mounted with its axis perpendicular and axially aligned with the center of said die plate, a floating header slidably mounted over the end of said shaft, adjacent to said die plate and rotatable with said shaft, a spring mounted in the interior of said shaft and against the end of said header, knives mounted on said header at an angle to said die plate and means for compressing said spring against said header to force said knives against said die plate under regulatable pressure, means for rotating said shaft.

2. An extruder including a die plate, means for extruding material through said die plate, a rotatable knife mounted to rotate across the face of said die plate, comprising a hollow shaft mounted with its axis perpendicular and axially aligned with the center of said die plate, a floating header slidably mounted over the end of said shaft, adjacent to said die plate and rotatable with said shaft, a spring mounted in the interior of said shaft and against the end of said header, knives mounted on said header at an angle to said die plate and means for compressing said spring against said header to force said knives against said die plate under regulatable pressure, means for rotating said shaft, and means to lubricate the said spring and said header.

3. In a device for cutting strands of material extruded through orifices of a die plate, a hollow shaft rotatably mounted with its axis perpendicular to said die plate, a floating header mounted over the end of said shaft adjacent said die plate, slidable along said shaft and rotatable therewith, knives mounted on said header at a cutting angle with respect to said die plate, and resilient means mounted in the interior of said shaft and against said header to compress said header and knives toward said die plate.

HENRY DOESKEN.

REFERENCES CITED

The following references are of record in the file of this patent:

UNITED STATES PATENTS

| Number | Name | Date |
|---|---|---|
| 855,379 | Bangs | May 28, 1907 |
| 1,205,710 | Cavagnaro | Nov. 21, 1916 |
| 1,825,475 | Pfeiffer | Sept. 29, 1931 |
| 2,032,624 | Lyons | Mar. 3, 1936 |
| 2,149,920 | Kretchmer | Mar. 7, 1939 |
| 2,278,513 | Emerson | Apr. 7, 1942 |